US009580138B2

(12) United States Patent
Tetsuka et al.

(10) Patent No.: US 9,580,138 B2
(45) Date of Patent: Feb. 28, 2017

(54) BICYCLE CRANK ASSEMBLY

(71) Applicant: SHIMANO INC., Sakai (JP)

(72) Inventors: Toshio Tetsuka, Sakai (JP); Shintarou Mori, Sakai (JP); Fumiaki Yoshida, Sakai (JP); Michihiro Kodama, Sakai (JP)

(73) Assignee: SHIMANO INC., Sakai (JP)

( * ) Notice: Subject to any disclaimer, the term of this patent is extended or adjusted under 35 U.S.C. 154(b) by 1 day.

(21) Appl. No.: 14/447,553

(22) Filed: Jul. 30, 2014

(65) Prior Publication Data
US 2016/0031523 A1  Feb. 4, 2016

(51) Int. Cl.
| | | |
|---|---|---|
| *B62M 3/00* | (2006.01) | |
| *B62M 3/16* | (2006.01) | |
| *B62M 6/90* | (2010.01) | |
| *B62J 99/00* | (2009.01) | |
| *G01L 3/10* | (2006.01) | |

(52) U.S. Cl.
CPC .............. *B62M 3/16* (2013.01); *B62M 3/00* (2013.01); *B62J 99/00* (2013.01); *B62J 2099/002* (2013.01); *B62J 2099/004* (2013.01); *B62J 2300/002* (2013.01); *B62K 2208/00* (2013.01); *B62M 6/90* (2013.01); *G01L 3/108* (2013.01)

(58) Field of Classification Search
CPC .. Y10T 74/2164; Y10T 74/2165; B62M 3/00; B62M 3/003; B62M 3/04; B62M 1/36; B62M 6/50; B62M 6/55; B62M 6/60; B62M 6/65; B62M 6/70; B62M 6/80; B62M 6/90; B62M 6/45; G01L 5/225; G01L 3/108; G01L 3/104; G01L 3/242; B62J 6/18; B62J 2300/002; B62J 2099/002; B62K 2208/00; B60R 16/04; B60R 16/033; B60R 16/0307

See application file for complete search history.

(56) References Cited

U.S. PATENT DOCUMENTS

| | | | |
|---|---|---|---|
| 4,833,777 A * | 5/1989 | Clark | ................ B62J 6/001 180/68.5 |
| 7,861,599 B2 | 1/2011 | Meggiolan | |
| 8,006,574 B2 | 8/2011 | Meyer | |
| 8,065,926 B2 | 11/2011 | Meyer | |
| 8,505,393 B2 | 8/2013 | Meyer | |
| 2010/0263468 A1 | 10/2010 | Fisher et al. | |
| 2012/0214646 A1 | 8/2012 | Lull et al. | |
| 2012/0330572 A1 | 12/2012 | Longman | |
| 2013/0019700 A1 | 1/2013 | Matsumoto | |
| 2013/0024137 A1* | 1/2013 | Grassi | .............. G01L 3/04 702/43 |
| 2013/0104650 A1 | 5/2013 | Bailey et al. | |
| 2013/0197744 A1 | 8/2013 | Tuulari et al. | |
| 2013/0205916 A1 | 8/2013 | Kodama et al. | |
| 2013/0210583 A1 | 8/2013 | Kametani et al. | |

\* cited by examiner

*Primary Examiner* — Daniel Yabut
(74) *Attorney, Agent, or Firm* — Mori & Ward, LLP

(57) ABSTRACT

A bicycle crank assembly comprises a crank axle, a first crank arm, and a battery holding structure. The crank axle comprises a cavity and a first end portion. A battery unit is to be provided in the cavity. The first end portion has a first end opening which is in communication with the cavity. The first crank arm is configured to be mounted on the first end portion. The battery holding structure is configured to hold the battery unit in the cavity. The battery holding structure is configured so that the battery unit is replaceable through the first end opening in a state where the first crank arm is mounted on the first end portion of the crank axle.

29 Claims, 17 Drawing Sheets

BICYCLE CRANK ASSEMBLY

BACKGROUND OF THE INVENTION

Field of the Invention

The present invention relates to a bicycle crank assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle crank assembly. For example, a battery is mounted to the bicycle crank assembly for supplying electrical power to bicycle electronic components.

SUMMARY OF THE INVENTION

In accordance with a first aspect of the present invention, a bicycle crank assembly comprises a crank axle, a first crank arm, and a battery holding structure. The crank axle comprises a cavity and a first end portion. A battery unit is to be provided in the cavity. The first end portion has a first end opening which is in communication with the cavity. The first crank arm is configured to be mounted on the first end portion. The battery holding structure is configured to hold the battery unit in the cavity. The battery holding structure is configured so that the battery unit is replaceable through the first end opening in a state where the first crank arm is mounted on the first end portion of the crank axle.

In accordance with a second aspect of the present invention, the bicycle crank assembly according to the first aspect is configured so that the battery holding structure includes a first member configured to be detachably attached to the first end portion of the crank axle.

In accordance with a third aspect of the present invention, the bicycle crank assembly according to the second aspect further comprises a first electric contact configured to electrically contact a first terminal of the battery unit. The first member includes a first body configured to be detachably attached to the first end portion. The first electric contact is configured to be attached to the first body.

In accordance with a fourth aspect of the present invention, the bicycle crank assembly according to the third aspect is configured so that the first member includes a cover element configured to be detachably attached to the first body. The cover element at least partially covers the first end opening in a state where the first member is attached to the first end portion.

In accordance with a fifth aspect of the present invention, the bicycle crank assembly according to the third aspect is configured so that the first body is made of a first material comprising a resin material.

In accordance with a sixth aspect of the present invention, the bicycle crank assembly according to the third aspect is configured so that the first member includes a lock element configured to prevent the first body from being removed from the crank axle.

In accordance with a seventh aspect of the present invention, the bicycle crank assembly according to the sixth aspect is configured so that the lock element has a lock state in which the first body is prevented from being removed from the crank axle, and a release state in which the first body is removable from the crank axle.

In accordance with an eighth aspect of the present invention, the bicycle crank assembly according to the seventh aspect is configured so that the first member includes a switching element configured to switch a state of the lock element between the lock state and the release state.

In accordance with a ninth aspect of the present invention, the bicycle crank assembly according to the second aspect is configured so that the battery holding structure includes a second member configured to hold the battery unit in the cavity together with the first member.

In accordance with a tenth aspect of the present invention, the bicycle crank assembly according to the ninth aspect is configured so that the second member includes a second body and a coupling portion. The second body is configured to be provided in the cavity to hold the battery unit in the cavity together with the first member. The coupling portion is configured to couple the second body to the crank axle so that the second body is rotatable integrally with the crank axle.

In accordance with an eleventh aspect of the present invention, the bicycle crank assembly according to the tenth aspect further comprises a second electric contact configured to electrically contact a second terminal of the battery unit and configured to be attached to the second body.

In accordance with a twelfth aspect of the present invention, the bicycle crank assembly according to the tenth aspect further comprises a second crank arm. The crank axle includes a second end portion and a coupling hole. The second end portion is opposite to the first end portion. The second crank arm is configured to be mounted on the second end portion of the crank axle. The coupling hole is provided at the second end portion and extends in a radial direction of the crank axle. The coupling portion is at least partially provided in the coupling hole to couple the second body to the crank axle.

In accordance with a thirteenth aspect of the present invention, the bicycle crank assembly according to the tenth aspect is configured so that the second member includes an extending portion extending from the second body along a rotational center axis of the crank axle. The extending portion is provided between the battery unit and an inner peripheral surface of the crank axle in a radial direction of the crank axle in a state where the first member and the second member hold the battery unit in the cavity.

In accordance with a fourteenth aspect of the present invention, the bicycle crank assembly according to the ninth aspect further comprises a first electric contact and a second electric contact. The first electric contact is configured to electrically contact a first terminal of the battery unit and is configured to be attached to the first member. The second electric contact is configured to electrically contact a second terminal of the battery unit and is configured to be attached to the second member.

In accordance with a fifteenth aspect of the present invention, the bicycle crank assembly according to the fourteenth aspect further comprises a first connector and a second connector. The first connector is configured to be electrically connected to the first electric contact. The second connector is configured to be electrically connected to the second electric contact and is configured to be detachably attached to the first connector to electrically connect the first electric contact to the second electric contact.

In accordance with a sixteenth aspect of the present invention, the bicycle crank assembly according to the fifteenth aspect is configured so that the first connector is attached to the first member. The second connector is attached to the second member.

In accordance with a seventeenth aspect of the present invention, the bicycle crank assembly according to the sixteenth aspect is configured so that at least one of the first connector and the second connector is provided between the battery unit and an inner peripheral surface of the crank axle in a radial direction of the crank axle in the state where the first member and the second member hold the battery unit in the cavity.

In accordance with an eighteenth aspect of the present invention, the bicycle crank assembly according to the ninth aspect is configured so that the second member is made of a second material comprising a resin material.

In accordance with a nineteenth aspect of the present invention, the bicycle crank assembly according to the second aspect is configured so that the battery holding structure includes a seal member configured to be provided between the first member and an inner peripheral surface of the crank axle.

In accordance with a twentieth aspect of the present invention, the bicycle crank assembly according to the first aspect is configured so that the crank axle has a rotational center axis. The battery unit has a center axis defined along the rotational center axis in a state where the battery holding structure holds the battery unit in the cavity. The battery holding structure is configured to hold the battery unit in the cavity so that the center axis of the battery unit is offset from the rotational center axis.

In accordance with a twenty-first aspect of the present invention, the bicycle crank assembly according to the first aspect further comprises a chain wheel rotatable integrally with the crank axle and configured to engage with a bicycle chain. The crank axle includes a second end portion opposite to the first end portion. The chain wheel is closer to the second end portion than the first end portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
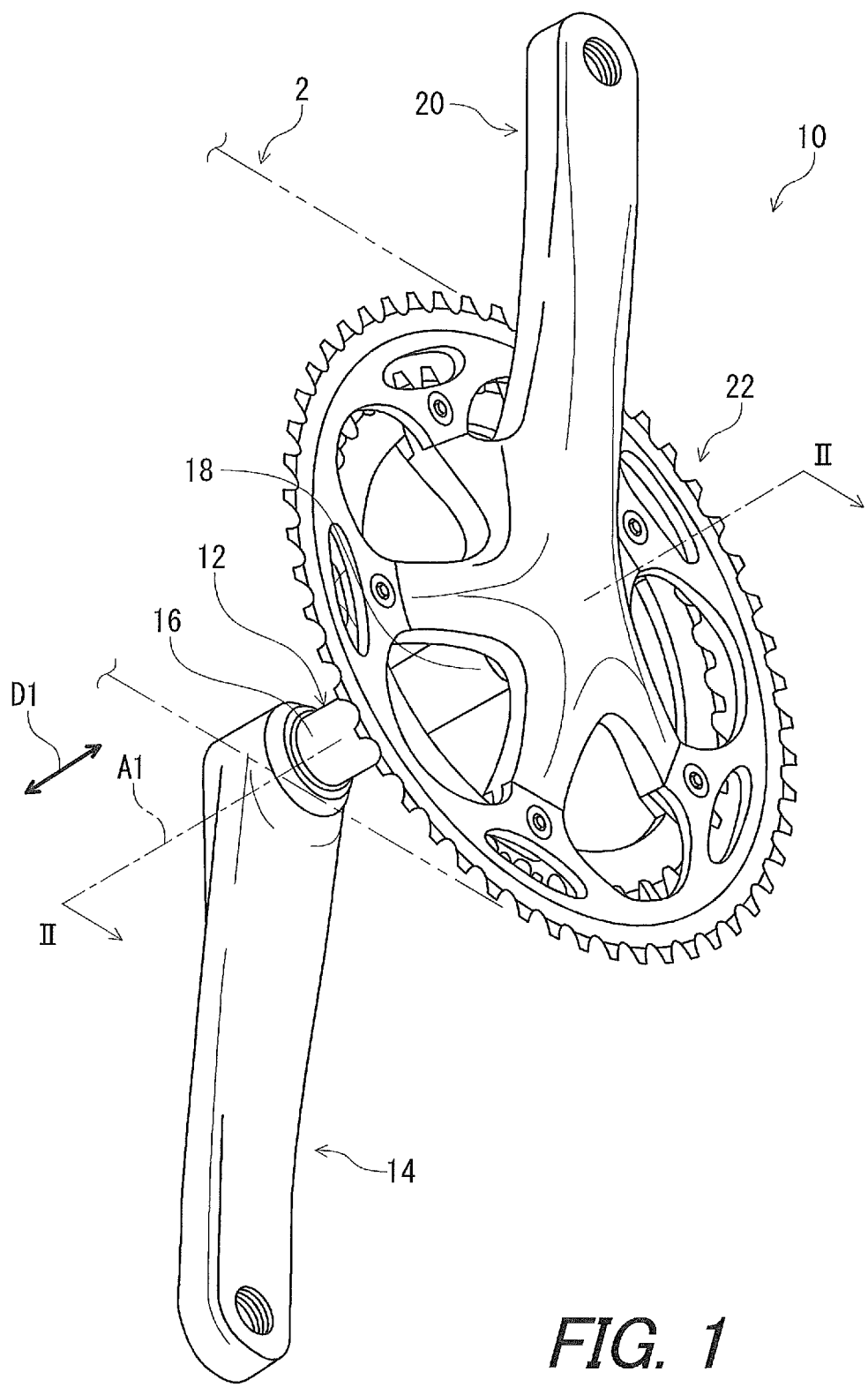
FIG. 1 is a perspective view of a bicycle crank assembly in accordance with an embodiment.

The embodiments will now be described with reference to the accompanying drawings, wherein like reference numerals designate corresponding or identical elements throughout the various drawings.

Referring initially to FIG. 1, a bicycle crank assembly 10 in accordance with an embodiment comprises a crank axle 12 and a first crank arm 14. The crank axle 12 comprises a first end portion 16. The first crank arm 14 is configured to be mounted on the first end portion 16. The crank axle 12 includes a second end portion 18 opposite to the first end portion 16. The bicycle crank assembly 10 further comprises a second crank arm 20. The second crank arm 20 is configured to be mounted on the second end portion 18 of the crank axle 12. The crank axle 12 has a rotational center axis A1. The crank axle 12 is integrally rotatable with the first crank arm 14 and the second crank arm 20 about the rotational center axis A1. The crank axle 12 is rotatably supported about the rotational center axis A1 by a bicycle bottom bracket assembly (not shown).

In the illustrated embodiment, the first crank arm 14 is a left crank arm, and the second crank arm 20 is a right crank arm. However, the first crank arm 14 can be a right crank arm, and the second crank arm 20 can be a left crank arm if needed and/or desired. Similarly, the first end portion 16 is a left end portion of the crank axle 12, and second end portion 18 is a right end portion of the crank axle 12. However, the first end portion 16 can be a left end portion of the crank axle 12, and second end portion 18 can be a right end portion of the crank axle 12 if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle crank assembly 10, should be interpreted relative to the bicycle equipped with the bicycle crank assembly 10 as used in an upright riding position on a horizontal surface.

As seen in FIG. 1, the bicycle crank assembly 10 further comprises a chain wheel 22 rotatable integrally with the crank axle 12. More specifically, the chain wheel 22 is integrally rotatable with the crank axle 12 about the rotational center axis A1. The chain wheel 22 is configured to engage with a bicycle chain 2. In the illustrated embodiment, the chain wheel 22 is closer to the second end portion 18 than the first end portion 16. More specifically, the chain wheel 22 is closer to the second end portion 18 than the first end portion 16 in an axial direction D1 defined along the rotational center axis A1. However, the chain wheel 22 can be closer to the first end portion 16 than the second end portion 18 if needed and/or desired. The chain wheel 22 is mounted to the second crank arm 20. Namely, the chain wheel 22 is mounted on the second end portion 18 of the crank axle 12 via the second crank arm 20.

Figure 2:
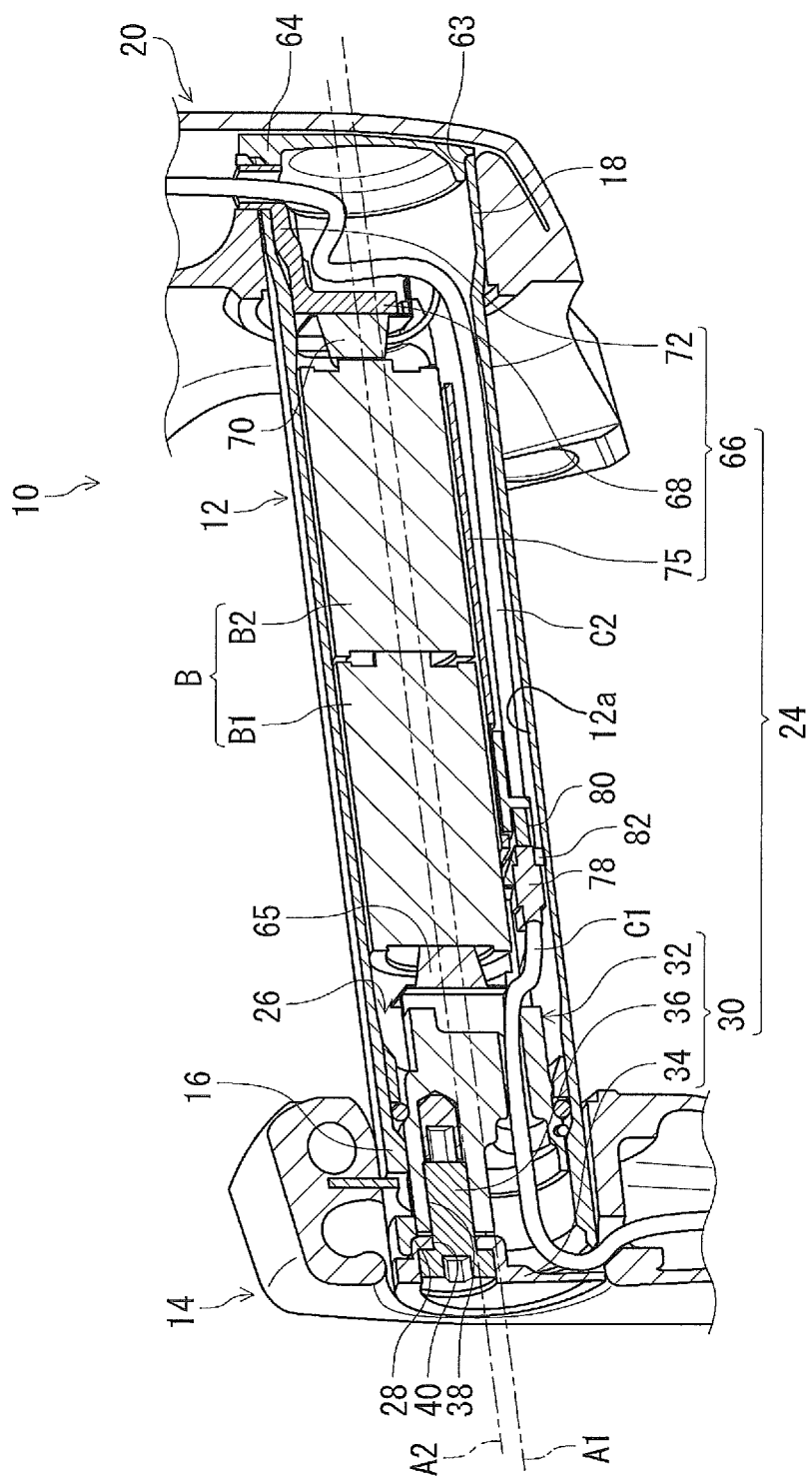
FIG. 2 is a cross-sectional view of the bicycle crank assembly taken along line II-II of FIG. 1.

As seen in FIG. 2, the bicycle crank assembly 10 comprises a battery holding structure 24. The crank axle 12 comprises a cavity 26 in which a battery unit B is to be provided. The battery holding structure 24 is configured to hold the battery unit B in the cavity 26. The crank axle 12 has a cylindrical shape and extends along the rotational center axis A1. The cavity 26 is defined in the crank axle 12. The battery unit B is configured to supply electrical power to various bicycle electronic components. In the illustrated embodiment, the battery unit B includes a first battery B1 and a second battery B2. For example, the first battery B1 and the second battery B2 are rechargeable batteries or dry-cell batteries. A total number of batteries of the battery unit B is not limited to the illustrated embodiment.

The first end portion 16 has a first end opening 28 which is in communication with the cavity 26. The battery holding structure 24 is configured so that the battery unit B is replaceable through the first end opening 28 in a state where the first crank arm 14 is mounted on the first end portion 16 of the crank axle 12. The battery holding structure 24 includes a first member 30 configured to be detachably attached to the first end portion 16 of the crank axle 12.

Figure 3:
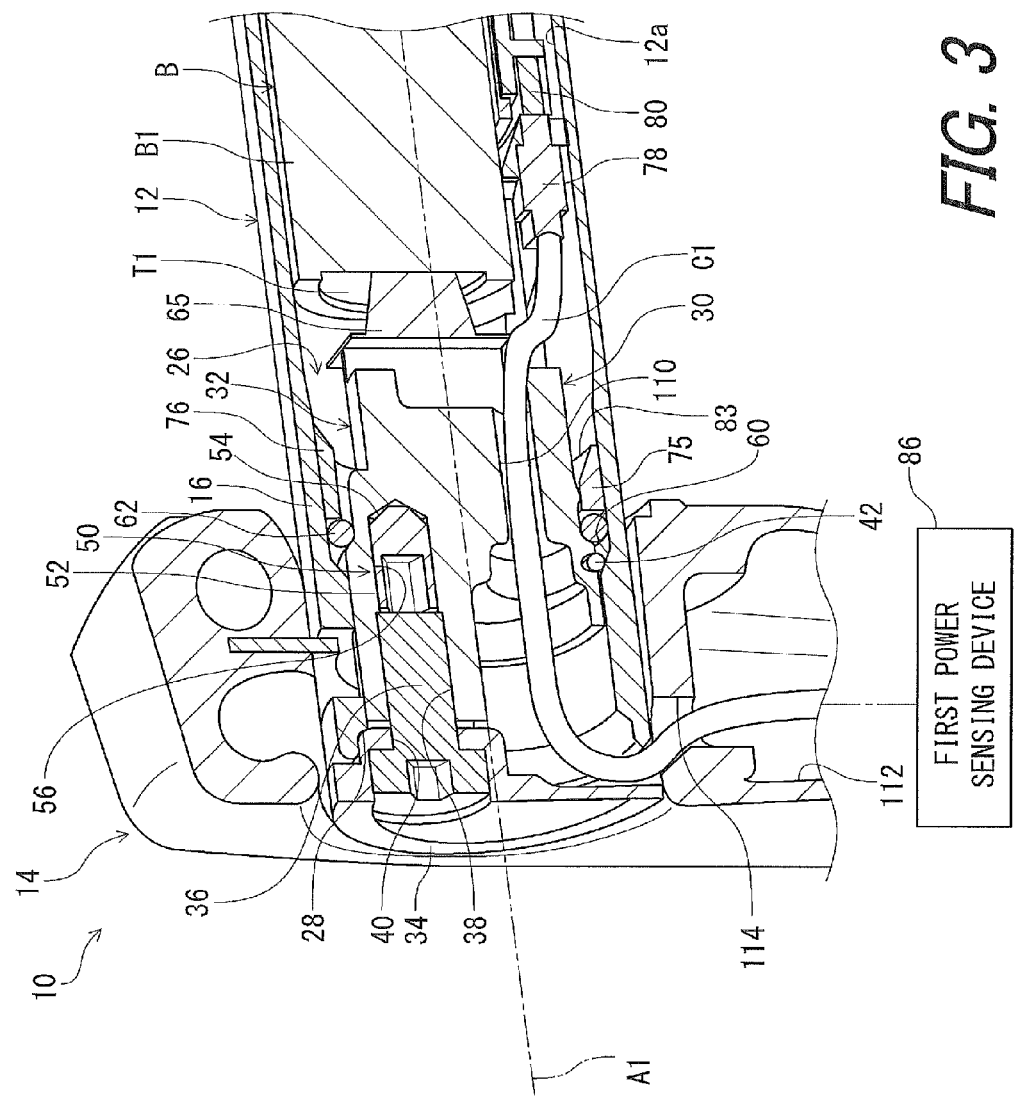
FIG. 3 is an enlarged partial cross-sectional view of the bicycle crank assembly illustrated in FIG. 2.
Figure 4:
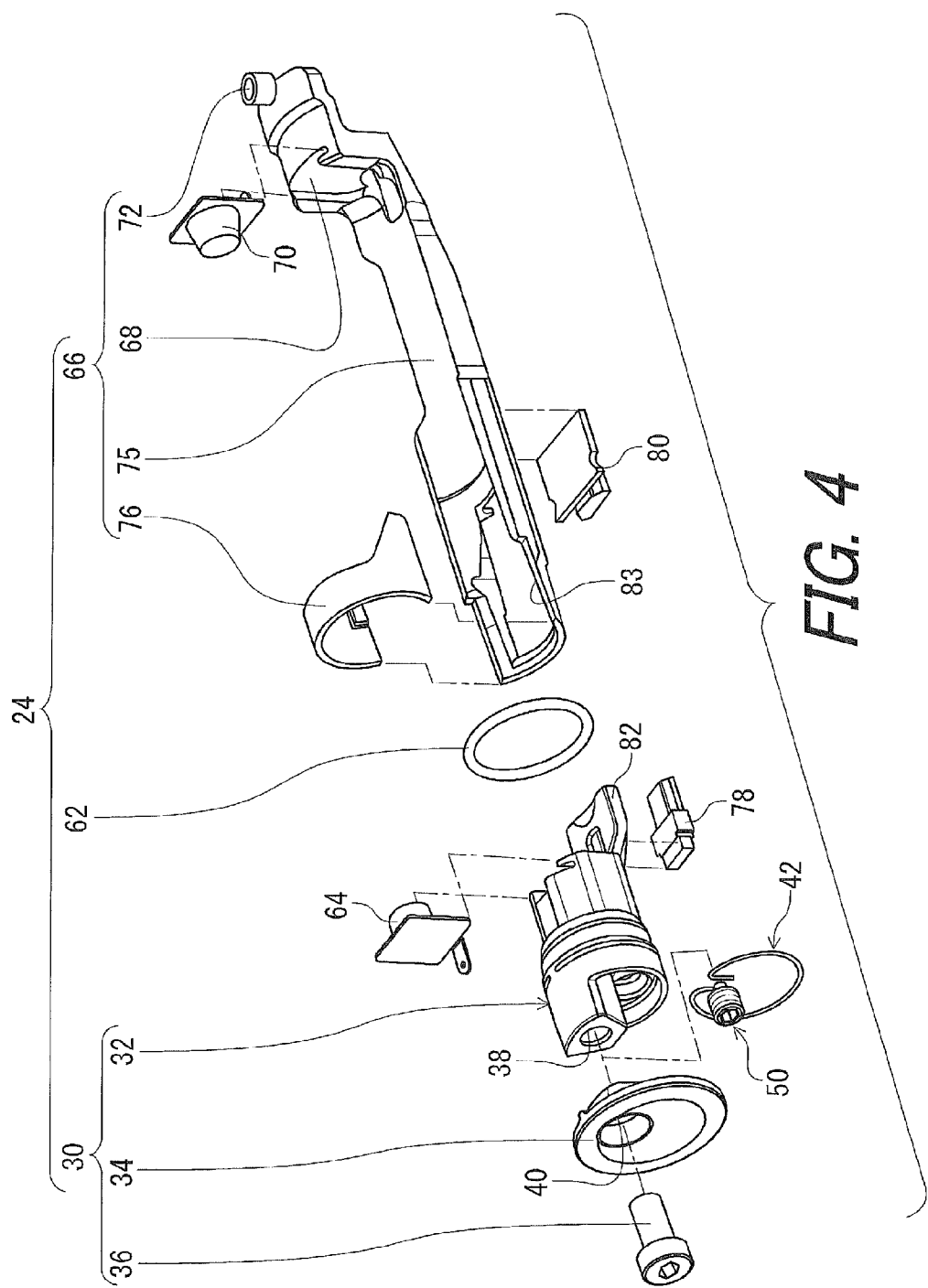
FIG. 4 is an exploded perspective view of a battery holding structure of the bicycle crank assembly illustrated in FIG. 2.

As seen in FIGS. 3 and 4, the first member 30 includes a first body 32 configured to be detachably attached to the first end portion 16. As seen in FIG. 3, the first body 32 is disposed in the cavity 26 of the crank axle 12 in a state where the first member 30 is attached to the first end portion 16.

As seen in FIGS. 3 and 4, the first member 30 includes a cover element 34 configured to be detachably attached to the first body 32. As seen in FIG. 3, the cover element 34 at least partially covers the first end opening 28 in the state where the first member 30 is attached to the first end portion 16. In the illustrated embodiment, as seen in FIGS. 3 and 4, the cover element 34 is a separate member from the first body 32. However, the cover element 34 can be integrally provided with the first body 32 as a single unitary member if needed and/or desired.

As seen in FIGS. 3 and 4, the first member 30 includes a fastener 36 configured to fasten the cover element 34 to the first body 32. In the illustrated embodiment, the fastener 36 is a screw. The first body 32 includes a threaded hole 38. The cover element 34 includes a through-hole 40. The fastener 36 extends through the through-hole 40 and is screwed in the threaded hole 38 in a state where the cover element 34 is fastened to the first body 32 by the fastener 36.

In a case where the first battery B1 and the second battery B2 of the battery unit B are rechargeable batteries, the first body 32 and/or the cover element 34 can include a charging connector (not shown) via which the battery unit B can be charged if needed and/or desired. A charging cable (not shown) can be connected to the charging connector for charging the battery unit B. Furthermore, a wireless charging unit (not shown) can be mounted on the first body 32 or the cover element 34 if needed and/or desired.

As seen in FIG. 4, the first member 30 includes a lock element 42 configured to prevent the first body 32 from being removed from the crank axle 12. In the illustrated embodiment, the lock element 42 has a substantially annular shape and is elastically deformable in a radial direction of the lock element 42. The lock element 42 has a changeable outer diameter. For example, the lock element 42 is made of a metallic material.

Figure 5:
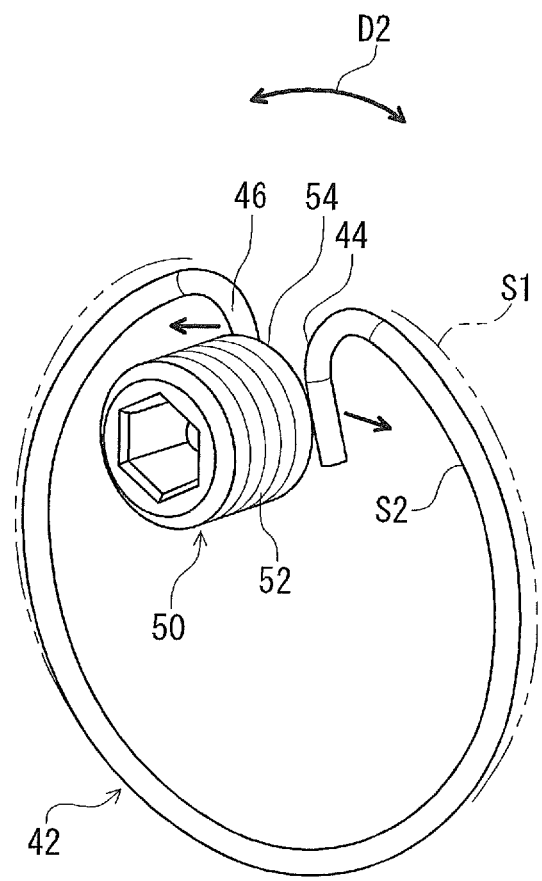
FIG. 5 is a perspective view of a lock element and a switching element of the bicycle crank assembly illustrated in FIG. 2.

As seen in FIG. 5, the lock element 42 is a substantially C-shaped ring and includes a first end 44 and a second end 46. The first end 44 is spaced apart from the second end 46 in a circumferential direction D2 of the lock element 42. The lock element 42 has a lock state S1 in which the first body 32 is prevented from being removed from the crank axle 12, and a release state S2 in which the first body 32 is removable from the crank axle 12. In the lock state S1, the lock element 42 has an outer diameter larger than an outer diameter in the release state S2.

Figure 6:
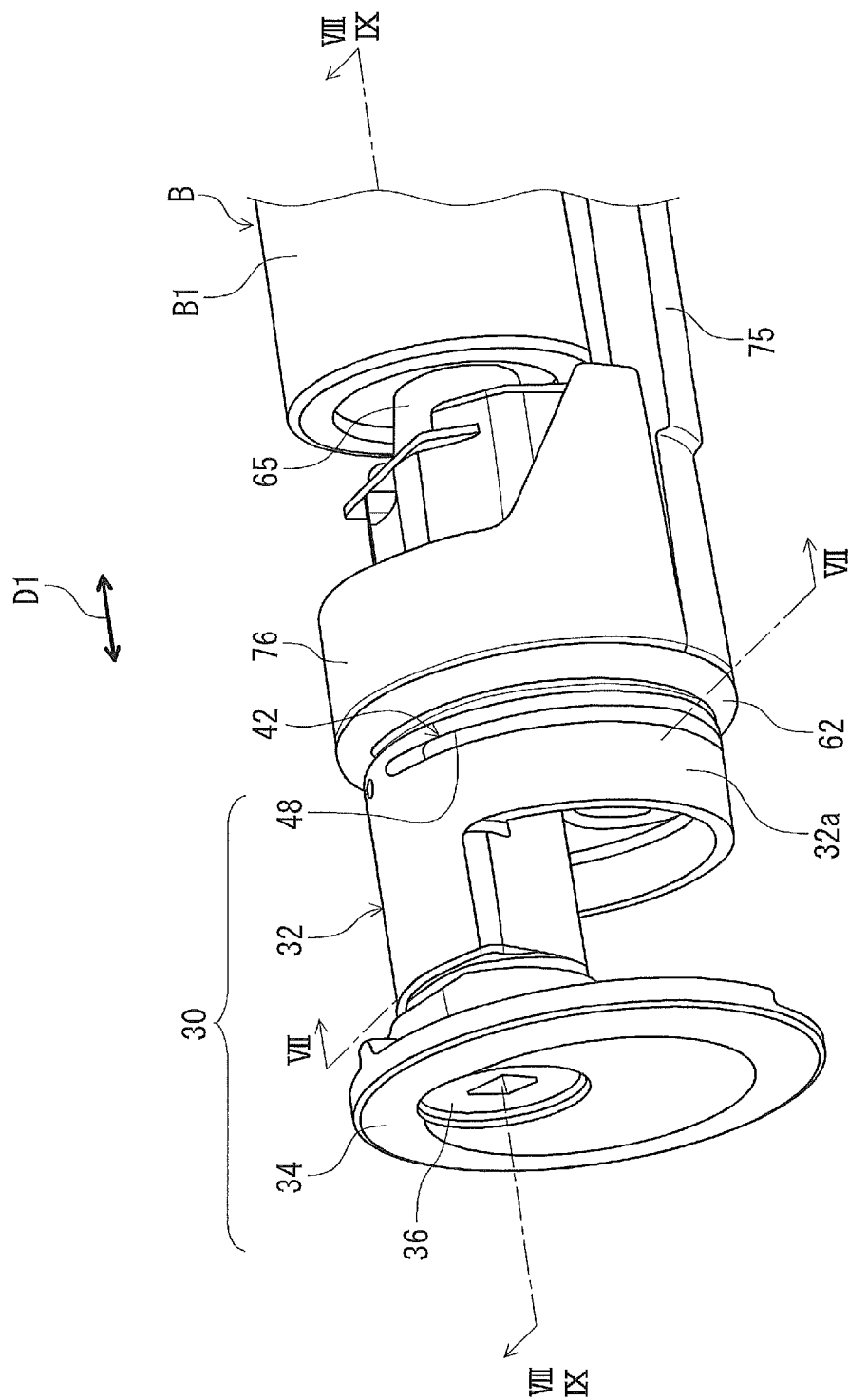
FIG. 6 is an enlarged partial perspective view of the battery holding structure of the bicycle crank assembly illustrated in FIG. 2.

As seen in FIG. 6, the lock element 42 is configured to be attached to the first body 32. The first body 32 includes an attachment groove 48 extending in a circumferential direction of the first body 32. The attachment groove 48 is provided on an outer peripheral surface 32a of the first body 32. The lock element 42 is provided in the attachment groove 48 to be elastically deformable in the radial direction of the lock element 42.

As seen in FIG. 5, the first member 30 includes a switching element 50 configured to switch a state of the lock element 42 between the lock state S1 and the release state S2. In the illustrated embodiment, the switching element 50 is an adjustment screw. The switching element 50 includes an external thread 52 and a guiding portion 54.

As seen in FIG. 3, the first body includes an additional threaded hole 56. The switching element 50 is screwed in the additional threaded hole 56. In the illustrated embodiment, the additional threaded hole 56 is in communication with the threaded hole 38. However, the additional threaded hole 56 can be a separate hole from the threaded hole 38 if needed and/or desired.

Figure 7:
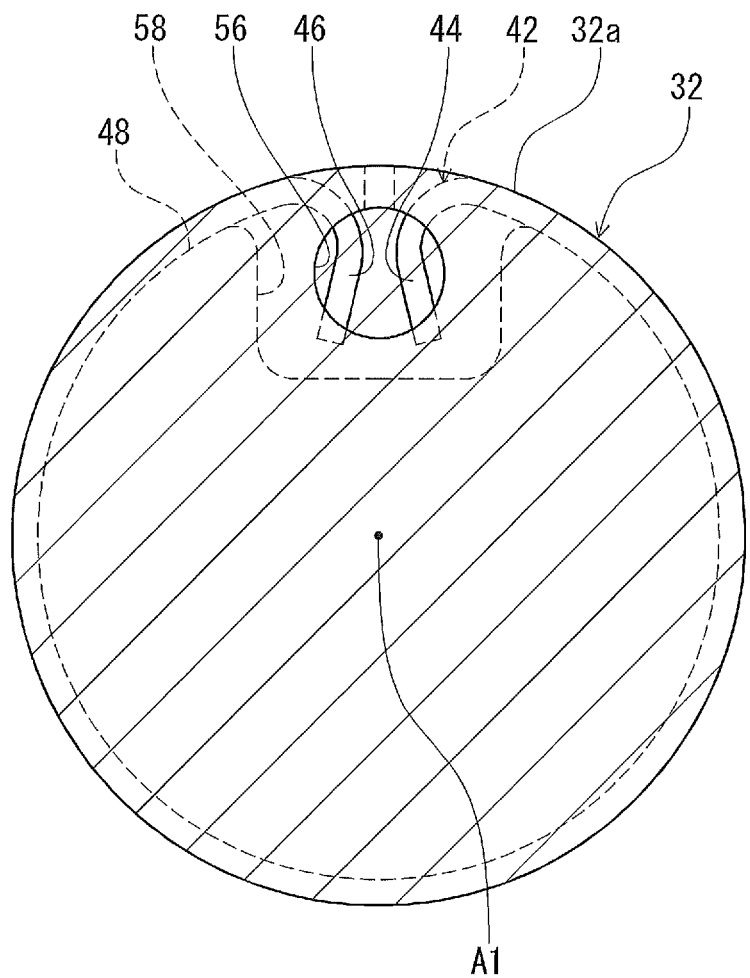
FIG. 7 is a cross-sectional view of the battery holding structure taken along line VII-VII of FIG. 6.

As seen in FIG. 7, the first body 32 includes a recess 58. The recess 58 is in communicate with the attachment groove 48 and the additional threaded hole 56. The first end 44 and the second end 46 are provided in the recess 58. The additional threaded hole 56 overlaps with the recess 58 when viewed from the axial direction D1 (FIG. 6) defined along the rotational center axis A1. Each of the first end 44 and the second end 46 at least partially overlaps with the additional threaded hole 56 when viewed from axial direction D1 (FIG. 6).

Figure 8:
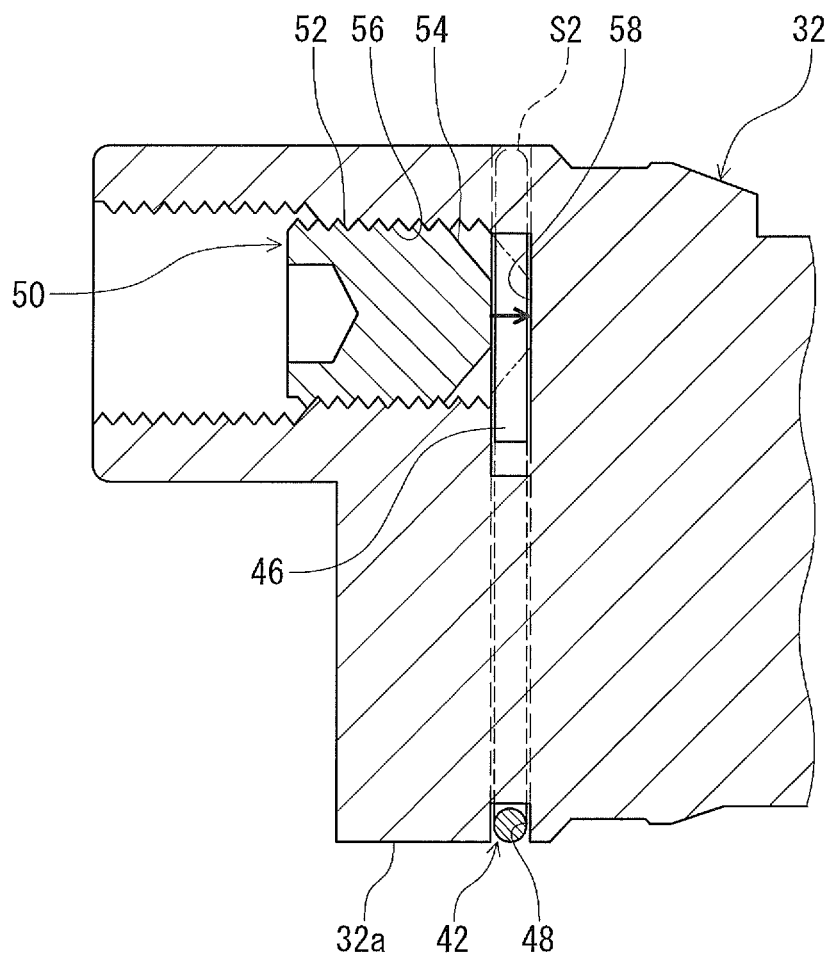
FIG. 8 is a cross-sectional view of the battery holding structure taken along line VIII-VIII of FIG. 6.

As seen in FIG. 8, the guiding portion 54 has a tapered shape and is contactable with the lock element 42. The guiding portion 54 is contactable with the first end 44 and the second end 46 of the lock element 42 (FIG. 5). In the release state S2, the lock element 42 is provided in the attachment groove 48 not to protrude from the radially outward from the outer peripheral surface 32a of the first body 32.

Figure 9:
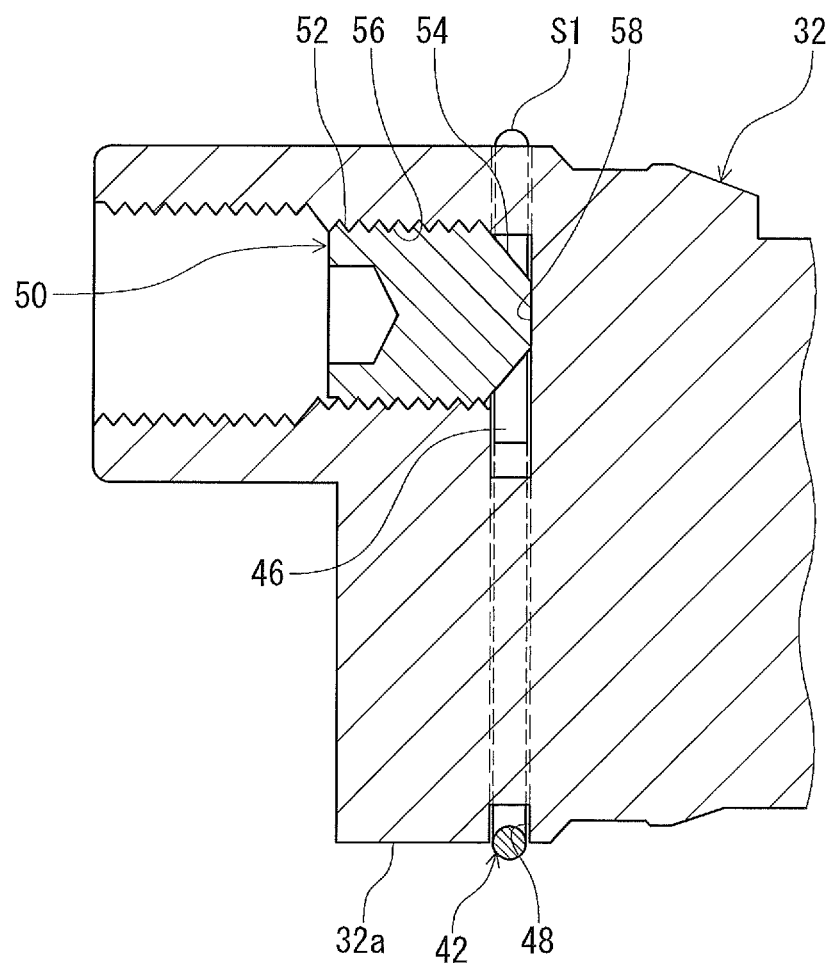
FIG. 9 is a cross-sectional view of the battery holding structure taken along line IX-IX of FIG. 6.

As seen in FIG. 9, the guiding portion 54 enters the recess 58 when the switching element 50 is tightened. At this time, as seen in FIG. 5, the guiding portion 54 guides the first end 44 and the second end 46 so that the first end 44 and the second end 46 move away from each other. As seen in FIG. 9, this causes the lock element 42 to be in the lock state S1. In the lock state S1, the lock element 42 is elastically deformed outwardly in the radial direction of the lock element 42 to at least partially protrude radially outward from the outer peripheral surface 32a of the first body 32.

As seen in FIG. 3, the crank axle 12 includes a contact part 60 provided in the cavity 26 of the crank axle 12. The contact part 60 extends in circumferential direction of the crank axle 12. The contact part 60 is provided radially outward of the first body 32 in the state where the first member 30 is attached to the first end portion 16 of the crank axle 12. The contact part 60 is contactable with the lock element 42 in the axial direction D1 of the crank axle 12. In the lock state S1 of the lock element 42, the lock element 42 contacts the contact part 60 in the axial direction D1 to prevent the first body 32 from being removed from the crank axle 12.

As seen in FIGS. 3 and 4, the battery holding structure 24 includes a seal member 62 configured to be provided between the first member 30 and an inner peripheral surface 12a of the crank axle 12. In this state, a space where the battery unit B is held in the cavity 26 is sealed from the first end opening 28 by the seal member 62.

Figure 10:
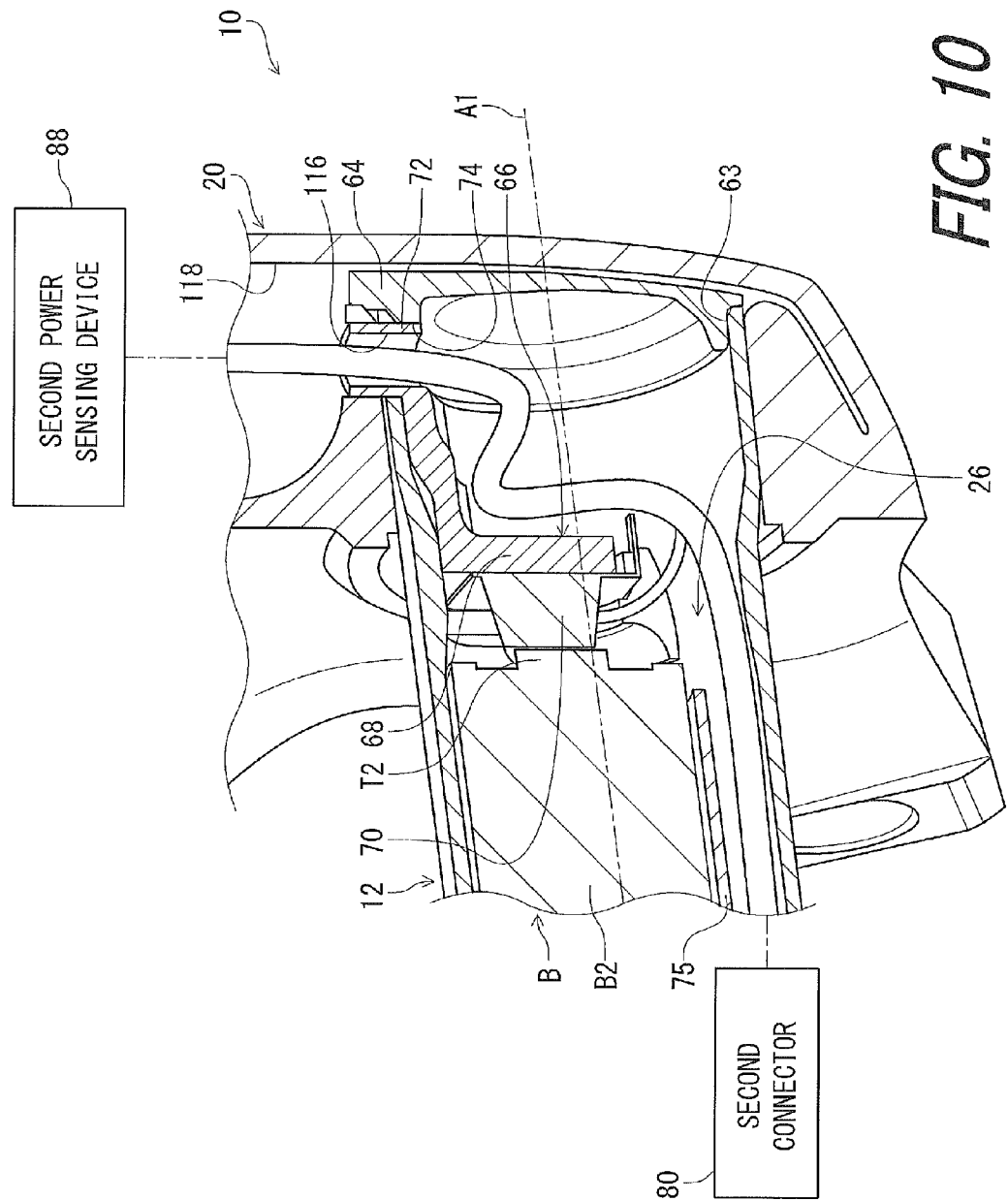
FIG. 10 is an enlarged partial cross-sectional view of the bicycle crank assembly illustrated in FIG. 2.

As seen in FIG. 10, the second end portion 18 includes a second end opening 63. The bicycle crank assembly 10 includes an end cap 64 attached to the second end portion 18 to cover the second end opening 63. Furthermore, the second crank arm 20 covers the end cap 64 and the second end portion 18 of the crank axle 12. In this state, the space where the battery unit B is provided in the cavity 26 is sealed by the end cap 64 and the second crank arm 20 from an outside of the bicycle crank assembly 10. An additional seal member such as the seal member 62 can be provided in the second end portion 18 of the crank axle 12 if needed and/or desired.

As seen in FIGS. 3 and 4, the bicycle crank assembly 10 further comprises a first electric contact 65 configured to electrically contact a first terminal of the battery unit B. In the illustrated embodiment, as seen in FIG. 3, the first electric contact 65 is configured to electrically contact a first terminal T1 of the first battery B1. The first electric contact 65 is configured to be attached to the first member 30. The first electric contact 65 is configured to be attached to the first body 32. However, the first electric contact 65 can be attached to portions other than the first body 32 if needed and/or desired. The first electric contact 65 is provided on an opposite side of the cover element 34 with respect to the first body 32. The first electric contact 65 is made of a metallic material having conductivity. The first body 32 is made of a first material comprising a resin material. For example, the resin material is an electric insulation material. However, the first material can include materials other than the resin material if needed and/or desired.

As seen in FIGS. 2 and 4, the battery holding structure 24 includes a second member 66 configured to hold the battery unit B in the cavity 26 together with the first member 30. The second member 66 includes a second body 68. As seen in FIG. 2, the second body 68 is configured to be provided in the cavity 26 to hold the battery unit B in the cavity 26 together with the first member 30.

As seen in FIGS. 4 and 10, the bicycle crank assembly 10 further comprises a second electric contact 70 configured to electrically contact a second terminal of the battery unit B. In the illustrated embodiment, as seen in FIG. 10, the second electric contact 70 is configured to electrically contact a second terminal T2 of the second battery B2. The second electric contact 70 is configured to be attached to the second member 66. The second electric contact 70 is configured to be attached to the second body 68. The second electric contact 70 is made of a metallic material having conductivity. The second member 66 is made of a second material comprising a resin material. For example, the resin material is an electric insulation material. However, the second material can include materials other than the resin material if needed and/or desired.

As seen in FIGS. 4 and 10, the second member 66 includes a coupling portion 72. As seen in FIG. 10, the coupling portion 72 is configured to couple the second body 68 to the crank axle 12 so that the second body 68 is rotatable integrally with the crank axle 12. The crank axle 12 includes a coupling hole 74. The coupling hole 74 is provided at the second end portion 18. The coupling hole 74 extends in a radial direction of the crank axle 12. The radial direction of the crank axle 12 is define to be parallel to the rotational center axis A1. The coupling portion 72 is at least partially provided in the coupling hole 74 to couple the second body 68 to the crank axle 12.

Figure 11:
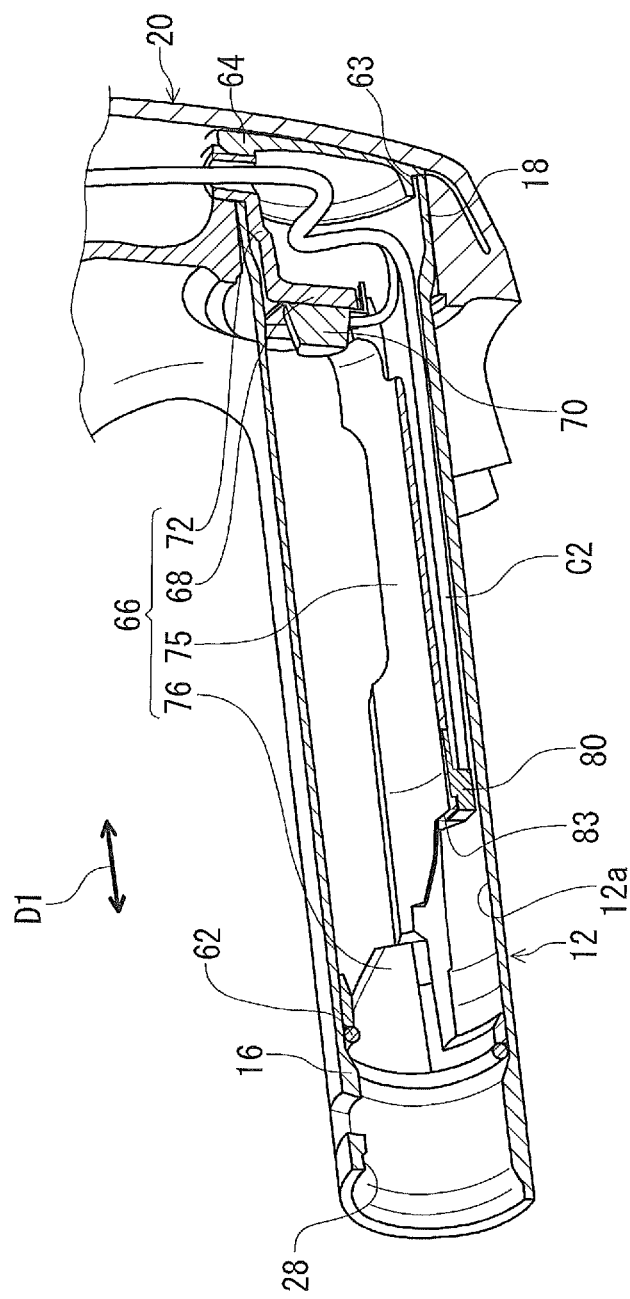
FIG. 11 is a cross-sectional view of the bicycle crank assembly with omitting a first member and a battery unit.

As seen in FIGS. 4 and 11, the second member 66 includes an extending portion 75 extending from the second body 68 along the rotational center axis A1 of the crank axle 12. The extending portion 75 extends from the second body 68 to the first end portion 16 along the rotational center axis A1. As seen in FIG. 11, the extending portion 75 extends along the inner peripheral surface 12a of the crank axle 12 in the axial direction D1.

As seen in FIG. 2, the extending portion 75 is provided between the battery unit B and the inner peripheral surface 12a of the crank axle 12 in the radial direction of the crank axle 12 in a state where the first member 30 and the second member 66 hold the battery unit B in the cavity 26.

As seen in FIGS. 4 and 11, the coupling portion 72 and the extending portion 75 are integrally provided with the second body 68 as a single unitary member. However, at least one of the coupling portion 72 and the extending portion 75 can be a separate member from the second body 68 if needed and/or desired.

As seen in FIGS. 4 and 11, the second member 66 includes a spacer 76. The spacer 76 has a substantially arch shape and extends in the circumferential direction of the crank axle 12. As seen in FIG. 11, the spacer 76 is provided at an end of the extending portion 75. The spacer 76 and the end of the extending portion 75 provides an annular portion disposed radially outward of the first body 32 (FIG. 3). The spacer 76 is a separate member from the extending portion 75. However, the spacer 76 can be integrally provided with the extending portion 75 if needed and/or desired.

As seen in FIGS. 2 and 4, the bicycle crank assembly 10 further comprises a first connector 78 and a second connector 80. The first connector 78 is configured to be electrically connected to the first electric contact 65. The second connector 80 is configured to be electrically connected to the second electric contact 70. The second connector 80 is configured to be detachably attached to the first connector 78 to electrically connect the first electric contact 65 to the second electric contact 70. The first connector 78 is attached to the first member 30. The second connector 80 is attached to the second member 66. In the illustrated embodiment, the first connector 78 is attached to the first body 32, and the second connector 80 is attached to the extending portion 75.

As seen in FIG. 4, the first body 32 includes a connector support 82. The first connector 78 is attached to the connector support 82. The extending portion 75 includes an opening 83. As seen in FIG. 3, the connector support 82 is disposed in the opening 83 in a state where the first body 32 is attached to the crank axle 12.

As seen in FIG. 2, the first connector 78 and the second connector 80 are aligned in the axial direction D1 in a state where the first member 30 and the second member 66 are attached to the crank axle 12 in the cavity 26. The first connector 78 and the second connector 80 are closer to the first electric contact 65 than the second electric contact 70 in the axial direction D1. The arrangement of the first connector 78 and the second connector 80 is not limited to the illustrated embodiment.

As seen in FIG. 2, the battery unit B has a center axis A2 defined along the rotational center axis A1 in a state where the battery holding structure 24 holds the battery unit B in the cavity 26. The battery holding structure 24 is configured to hold the battery unit B in the cavity 26 so that the center axis A2 of the battery unit B is offset from the rotational center axis A1.

More specifically, at least one of the first connector 78 and the second connector 80 is provided between the battery unit B and the inner peripheral surface 12a of the crank axle 12 in the radial direction of the crank axle 12 in the state where the first member 30 and the second member 66 hold the battery unit B in the cavity 26. In the illustrated embodiment, the first connector 78 and the second connector 80 are provided between the battery unit B and the inner peripheral surface 12a of the crank axle 12 in the radial direction of the crank axle 12.

The connector support 82 of the first body 32 is provided between the battery unit B and the inner peripheral surface 12a of the crank axle 12 in the radial direction of the crank axle 12. The extending portion 75 of the second member 66 is provided between the battery unit B and the inner peripheral surface 12a of the crank axle 12 in the radial direction of the crank axle 12. The battery unit B is partially contactable with the inner peripheral surface 12a of the crank axle 12 on an opposite side of the extending portion 75 with respect to the battery unit B.

Electrical power is supplied from the battery unit B to various bicycle electronic components via the battery holding structure 24. For example, as seen in FIG. 12, the bicycle crank assembly 10 includes a force measurement apparatus 84 configured to measure force (e.g., force or torque) applied to each of the first crank arm 14 and the second crank arm 20.

Figure 12:
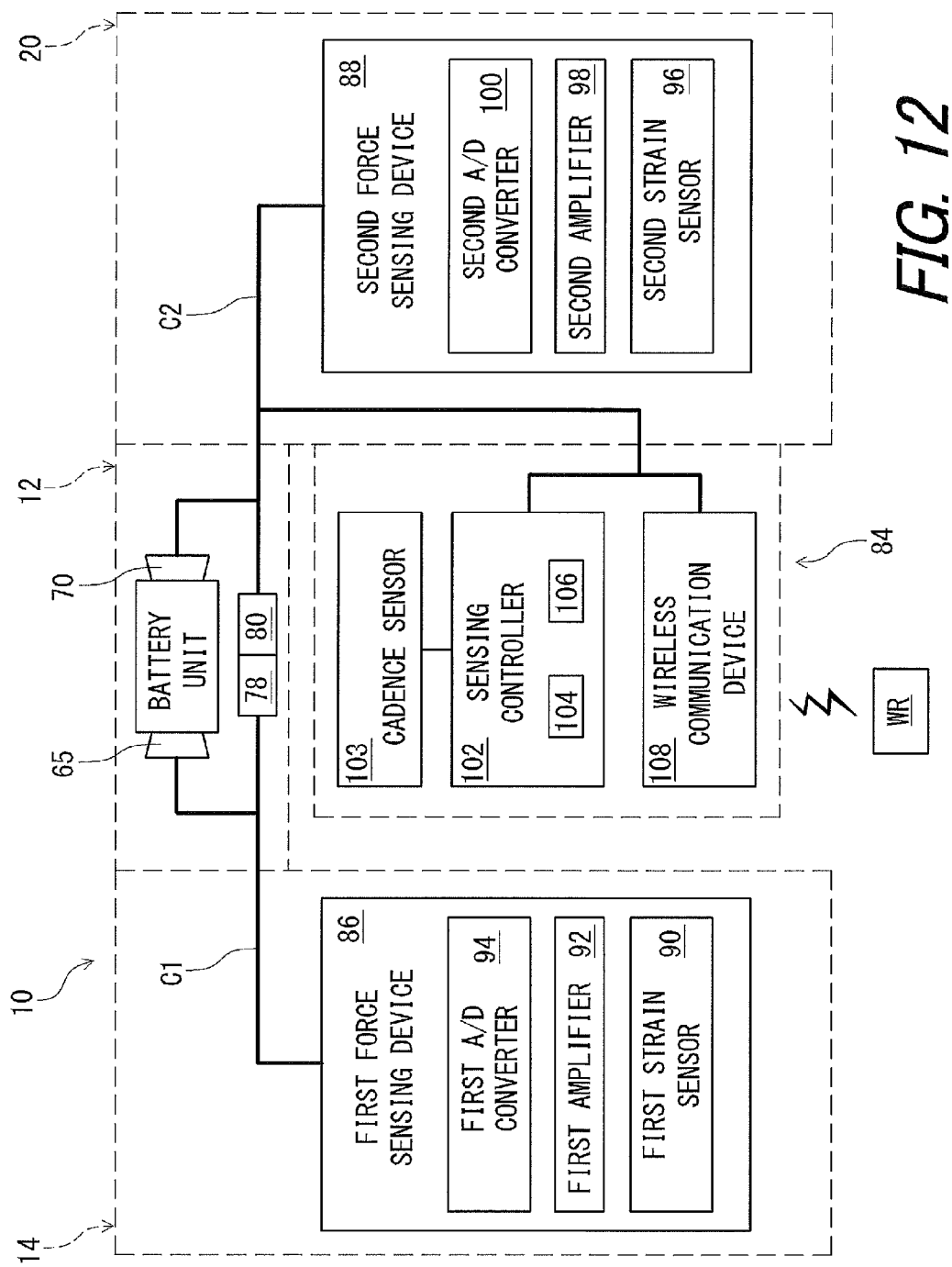
FIG. 12 is a block diagram of the bicycle crank assembly illustrated in FIG. 1.

As seen in FIG. 12, the force measurement apparatus 84 includes a first force sensing device 86 and a second force sensing device 88. The first force sensing device 86 is mounted on the first crank arm 14 and is configured to sense force (e.g., force or torque) applied to the first crank arm 14. The second force sensing device 88 is mounted on the second crank arm 20 and is configured to sense force (e.g., force or torque) applied to the second crank arm 20.

The first force sensing device 86 includes a first strain sensor 90, a first amplifier 92, and a first analog-to-digital (A/D) converter 94. The first strain sensor 90 is attached to the first crank arm 14 and is configured to sense strain occurring in the first crank arm 14 from a pedaling force. The first strain sensor 90 includes at least a strain gauge or a semiconductor sensor. The first amplifier 92 is configured to amplify an output of the first strain sensor 90. The first A/D converter 94 is configured to convert analog signals output from the first amplifier 92 to digital signals.

The second force sensing device 88 includes a second strain sensor 96, a second amplifier 98, and a second analog-to-digital (A/D) converter 100. The second strain sensor 96 is attached to the second crank arm 20 and is configured to sense strain occurring in the second crank arm 20 from a pedaling force. The second strain sensor 96 includes at least a strain gauge or a semiconductor sensor. The second amplifier 98 is configured to amplify an output of the second strain sensor 96. The second A/D converter 100 is configured to convert analog signals output from the second amplifier 98 to digital signals.

As seen in FIG. 12, the force measurement apparatus 84 includes a sensing controller 102 and a cadence sensor 103. The sensing controller 102 is configured to control the first force sensing device 86 and the second force sensing device 88. The cadence sensor 103 includes a magnetism sensor such as a lead switch or a hall sensor which is configured to sense a magnet mounted on the bicycle frame. The sensing controller 102 includes a first power calculator 104 and a second power calculator 106. The first power calculator 104 is configured to calculate power based on the digital signals output from the first A/D converter 94 of the first force sensing device 86 and the cadence sensor 103. The second power calculator 106 is configured to calculate power based on the digital signals output from the second A/D converter 100 of the second force sensing device 88 and the cadence sensor 103.

The force measurement apparatus 84 includes a wireless communication device 108 configured to wirelessly communicate with a wireless receiver WR. The wireless communication device 108 is configured to transmit wireless signals based on the power calculated by each of the first power calculator 104 and the second power calculator 106. The wireless receiver WR is configured to wirelessly receive wireless signals from the wireless communication device 108. The wireless receiver WR is mounted in a cycle computer (not shown) attached to a bicycle, for example.

As seen in FIG. 12, the first connector 78 is electrically connected to each of the first electric contact 65 and the first force sensing device 86 via a first electrical cable C1. The first electrical cable C1 includes a power line and a plurality of signal lines. The second connector 80 is electrically connected to each of the second electric contact 70, the second force sensing device 88, the sensing controller 102, and the wireless communication device 108 via a second electrical cable C2. The second electrical cable C2 includes a power line and a plurality of signal lines.

The first force sensing device 86 is electrically connected to the sensing controller 102 via the first electrical cable C1, the first connector 78, the second connector 80, and the second electrical cable C2. The second force sensing device 88 is electrically connected to the sensing controller 102 via the second electrical cable C2.

As seen in FIG. 3, the first body 32 of the first member 30 includes a first cable hole 110. The first crank arm 14 includes a first arm cavity 112 and a through-hole 114. The first electrical cable C1 extends through the first cable hole 110 and through-hole 114 to connect the first connector 78 to the first force sensing device 86 provided in the first arm cavity 112. The first electrical cable C1 extends through the first end opening 28 and a gap provided between the cover element 34 and the first end portion 16 of the crank axle 12.

As seen in FIG. 10, the coupling portion 72 of the second member 66 includes a second cable hole 116. The second crank arm 20 includes a second arm cavity 118. The second electrical cable C2 extends through the second cable hole 116 to connect the second connector 80 to the second force sensing device 88 provided in the second arm cavity 118.

Figure 13:
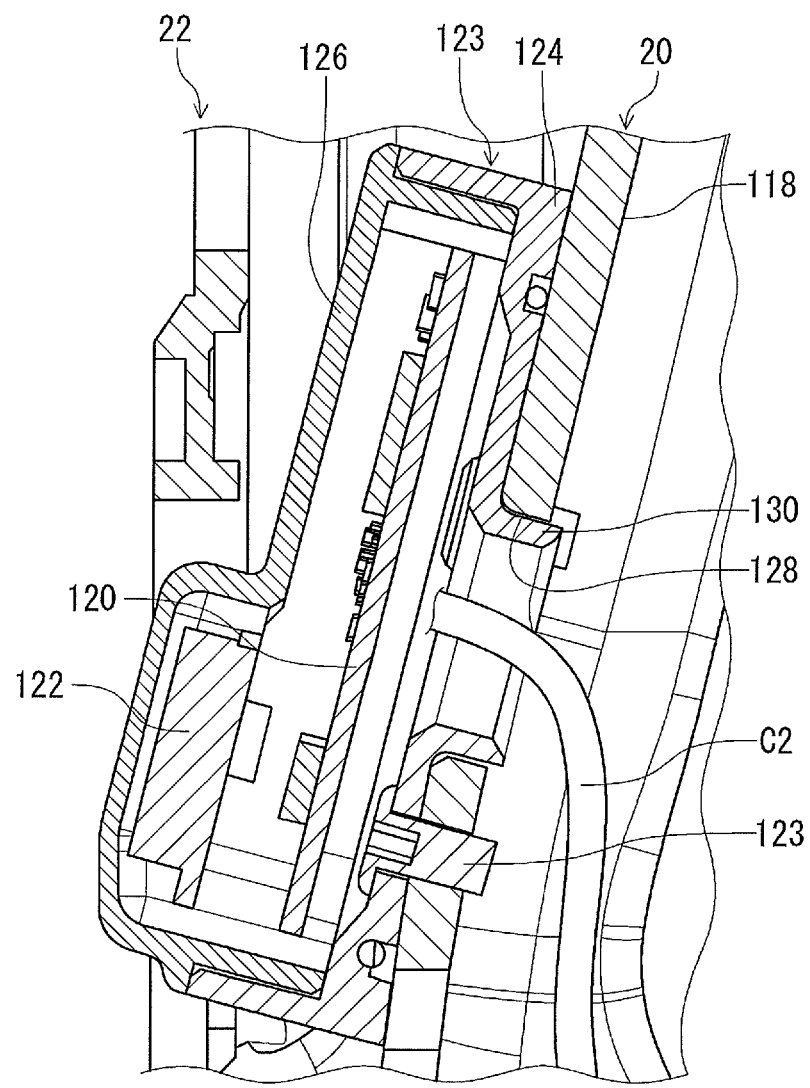
FIG. 13 is a cross-sectional view of the bicycle crank assembly taken along line XIII-XIII of FIG. 14.

As seen in FIG. 13, for example, the sensing controller 102 is mounted on a control substrate 120. The wireless communication device 108 is mounted on a wireless-communication substrate 122. The control substrate 120 and the wireless-communication substrate 122 are attached to the second crank arm 20.

Figure 14:
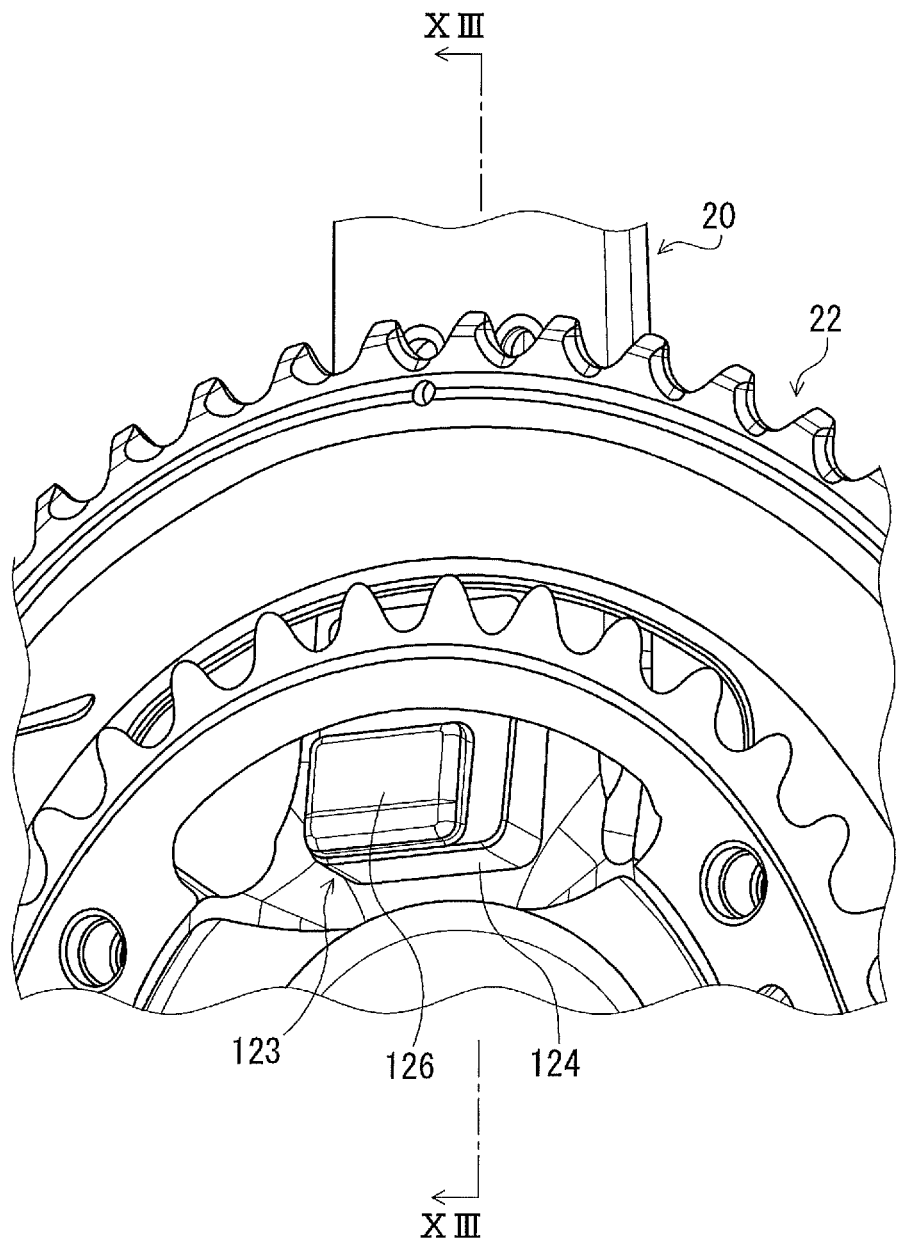
FIG. 14 is a partial perspective view of the bicycle crank assembly illustrated in FIG. 1.

As seen in FIGS. 13 and 14, the bicycle crank assembly 10 includes a housing 123. The housing 123 includes a base member 124 and a substrate cover 126. As seen in FIG. 13, the base member 124 is secured to the second crank arm 20 by a case fastener 123 such as a screw. The substrate cover 126 is configured to be detachably attached to the second crank arm 20 to cover the control substrate 120 and the wireless-communication substrate 122.

As seen in FIG. 13, the control substrate 120 and the wireless-communication substrate 122 are provided in the housing 123. The cadence sensor 103 (FIG. 12) is preferably provided in the housing 123. The second crank arm 20 includes an attachment hole 128. The base member 124 includes a cylindrical portion 130 provided in the attachment hole 128. The second electrical cable C2 extends through the cylindrical portion 130.

The wireless-communication substrate 122 can be provided outside the housing 123. In such an embodiment, for example, the wireless-communication substrate 122 is provided in another housing and is electrically connected to the control substrate 120 via an electrical cable. Furthermore, the wireless-communication substrate 122 can be provided on one of an upstream side and a downstream side of the second crank arm 20 in a rotational direction of the bicycle crank assembly 10.

The method of replacing the battery unit B will be described below referring to FIGS. 15 to 17.

Figure 15:
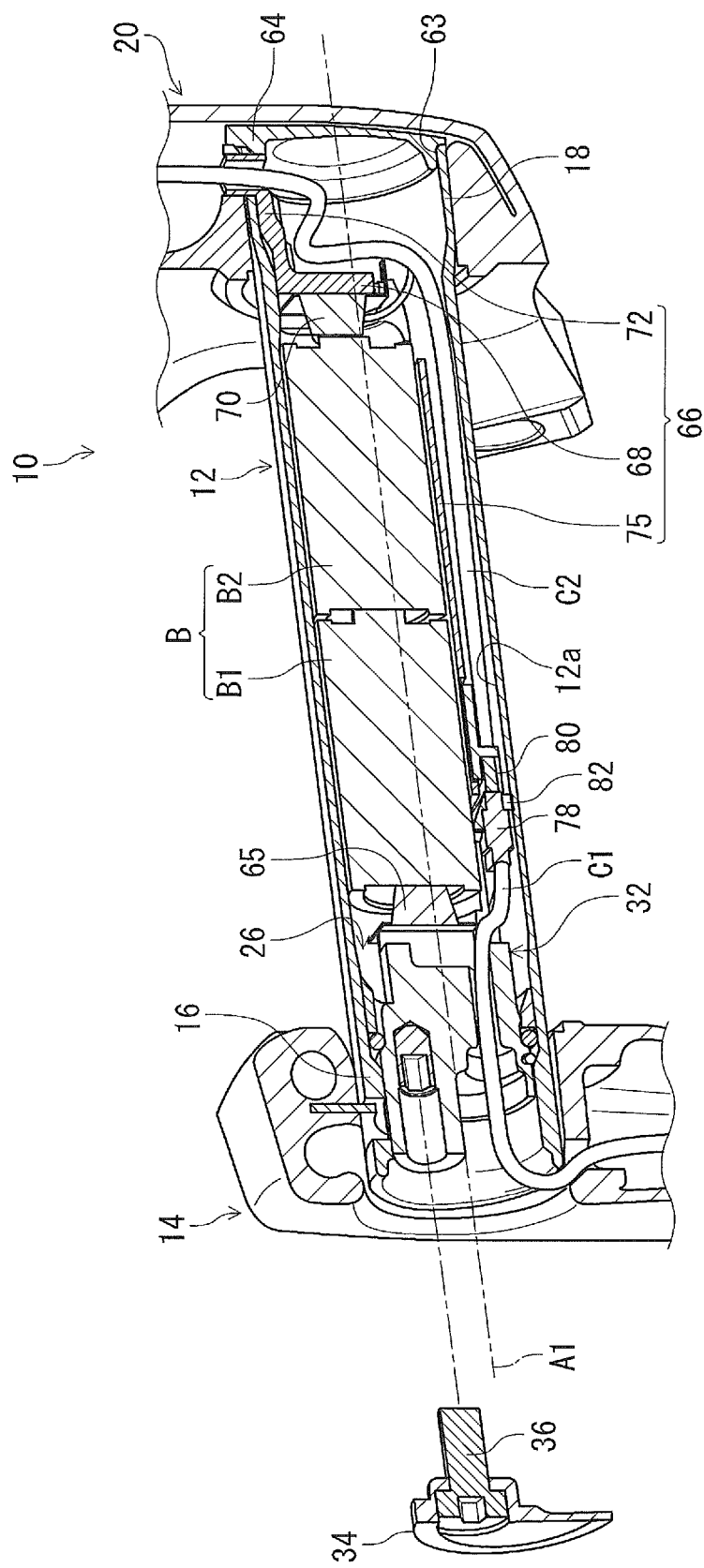
FIG. 15 is a cross-sectional view of the bicycle crank assembly for explaining a replacement of the battery unit.

As seen in FIG. 15, the first member 30 is detached from the first end portion 16 of the crank axle 12. More specifically, the fastener 36 is released to detach the cover element 34 from the first body 32. In a state where the cover element 34 is detached from the first end portion 16, the switching element 50 is released to put the lock element 42 into the release state S2 (FIG. 8).

Figure 16:
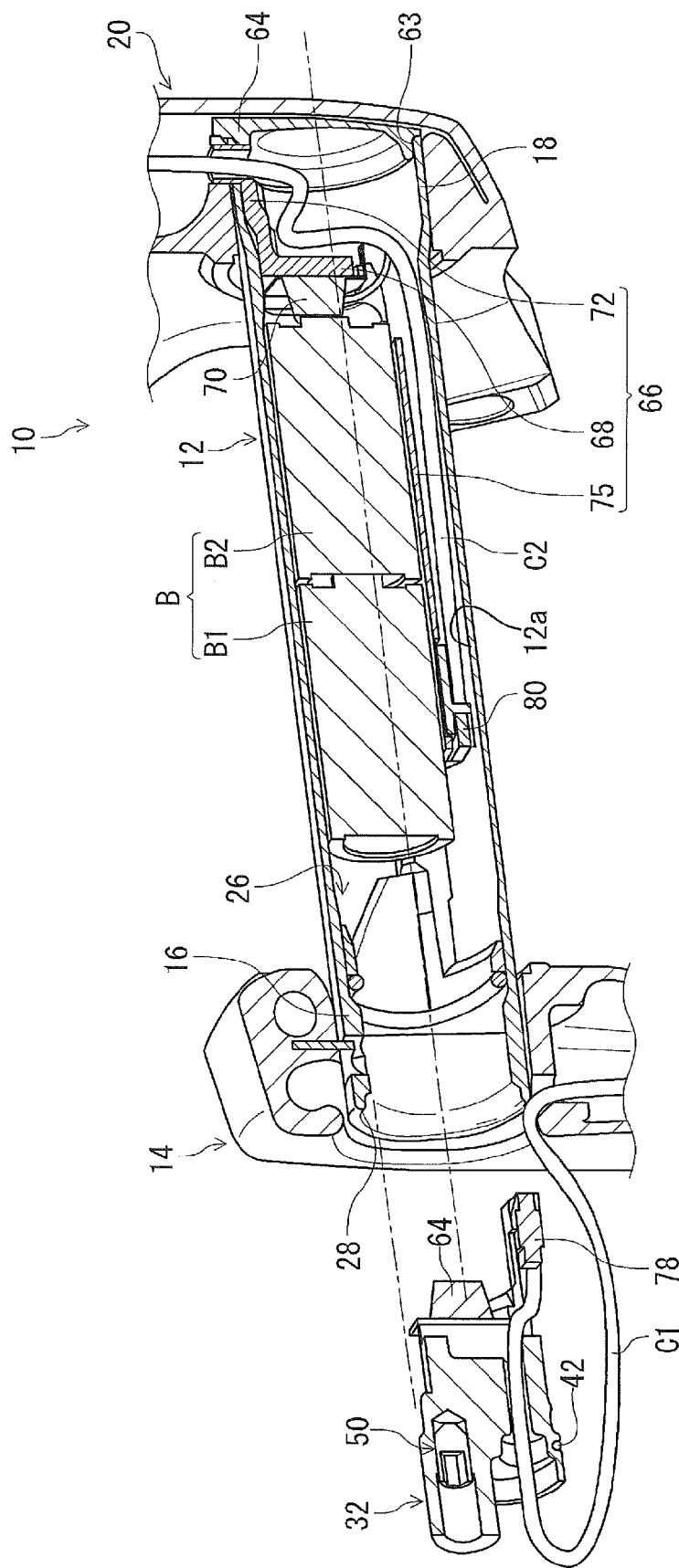
FIG. 16 is a cross-sectional view of the bicycle crank assembly for explaining the replacement of the battery unit.

As seen in FIG. 16, the first body 32 of the first member 30 can be detached from the crank axle 12 through the first end opening 28 in the release state S2 of the lock element 42. When the first body 32 is detached from the crank axle 12 through the first end opening 28, the first electrical cable C1 is pulled from the first crank arm 14. The first electrical cable C1 preferably has such an enough length that the first electrical cable C1 can be detached from the crank axle 12.

Figure 17:
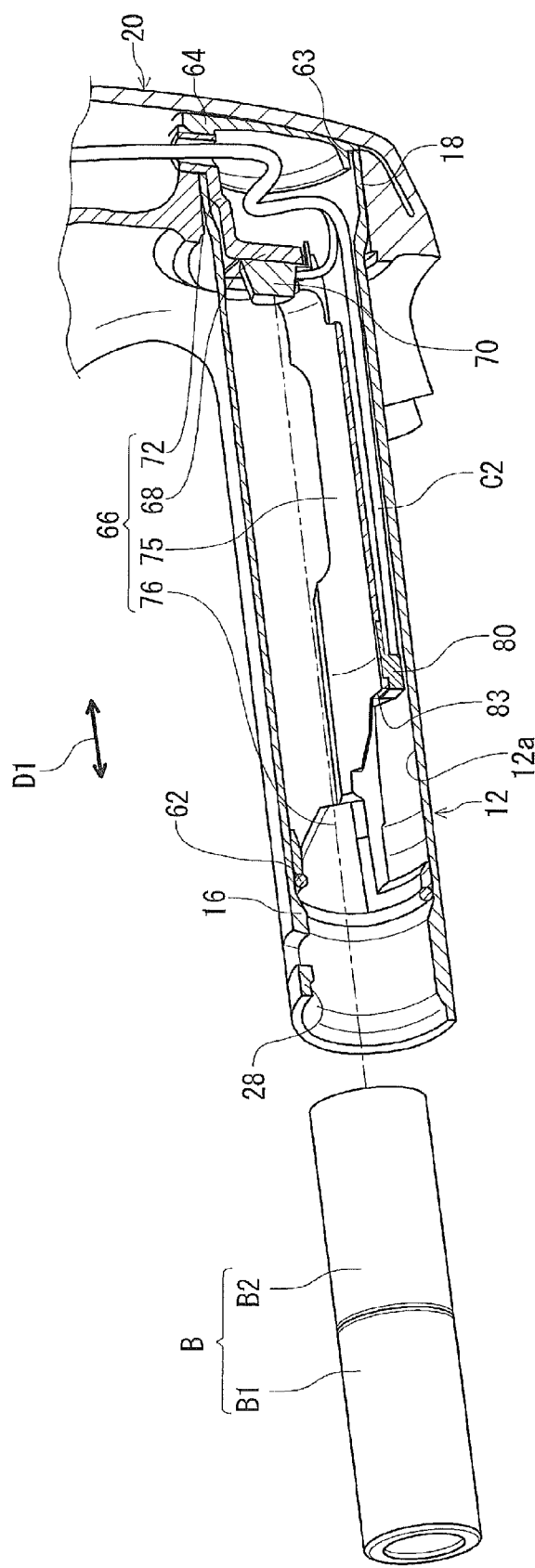
FIG. 17 is a cross-sectional view of the bicycle crank assembly for explaining the replacement of the battery unit.

As seen in FIG. 17, in a state where the first body 32 is removed from the crank axle 12, the battery unit B can be detached from the crank axle 12. At this time, there is no need to detach the first crank arm 14 from the first end portion 16 of the crank axle 12. The recharged battery unit B or a new battery unit (not shown) is inserted into the cavity 26 of the crank axle 12 through the first end opening 28. After that, the first member 30 (the first body 32 and the cover element 34) is attached to the first end portion 16 of the crank axle 12 in a reverse procedure to the above procedure as shown in FIGS. 15 and 16. The attaching of the first member 30 will not be described in detail here for the sake of brevity.

With the bicycle crank assembly 10, the battery holding structure 24 is configured so that the battery unit B is replaceable through the first end opening 28 in the state where the first crank arm 14 is mounted on the first end portion 16 of the crank axle 12. Accordingly, it is possible to replace the battery unit B without detaching the first crank arm 14 from the crank axle 12. This simplifies the replacing the battery unit B to the recharged battery unit B or a new battery unit.

In the present application, the term "attached" or "attaching", as used herein, can encompass configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle crank assembly comprising:
    a crank axle comprising:
        a rotational center axis;
        a cavity in which a battery unit is to be provided; and
        a first end portion having a first end opening which is in communication with the cavity;
    a first crank arm configured to be mounted on the first end portion;
    a battery holding structure configured to hold the battery unit in the cavity, the battery holding structure being configured so that the battery unit is replaceable through the first end opening in a state where the first crank arm is mounted on the first end portion of the crank axle, the battery holding structure including a first member configured to be detachably attached to the first end portion of the crank axle;
    a first electric contact configured to electrically contact a first terminal of the battery unit and configured to be attached to the first member; and
    a second electric contact configured to electrically contact a second terminal of the battery unit, the second electric contact being spaced apart from the first electric contact along the rotational center axis to define a space in which the battery unit is provided between the first electric contact and the second electric contact in a state where the first member is attached to the first end portion of the crank axle.

2. The bicycle crank assembly according to claim 1, wherein
    the first member includes a first body configured to be detachably attached to the first end portion, and
    the first electric contact is configured to be attached to the first body.

3. The bicycle crank assembly according to claim 2, wherein
    the first member includes a cover element configured to be detachably attached to the first body, and the cover element at least partially covers the first end opening in a state where the first member is attached to the first end portion.

4. The bicycle crank assembly according to claim 2, wherein
the first body is made of a first material comprising a resin material.

5. The bicycle crank assembly according to claim 2, wherein
the first member includes a lock element configured to prevent the first body from being removed from the crank axle.

6. The bicycle crank assembly according to claim 5, wherein
the lock element has
a lock state in which the first body is prevented from being removed from the crank axle, and
a release state in which the first body is removable from the crank axle.

7. The bicycle crank assembly according to claim 6, wherein
the first member includes a switching element configured to switch a state of the lock element between the lock state and the release state.

8. The bicycle crank assembly according to claim 1, wherein
the battery holding structure includes a second member configured to hold the battery unit in the cavity together with the first member.

9. The bicycle crank assembly according to claim 8, wherein
the second member includes
a second body configured to be provided in the cavity to hold the battery unit in the cavity together with the first member, and
a coupling portion configured to couple the second body to the crank axle so that the second body is rotatable integrally with the crank axle.

10. The bicycle crank assembly according to claim 9, wherein
the second electric contact is configured to be attached to the second body.

11. The bicycle crank assembly according to claim 9, further comprising:
a second crank arm, wherein
the crank axle includes
a second end portion opposite to the first end portion, the second crank arm being configured to be mounted on the second end portion of the crank axle, and
a coupling hole provided at the second end portion and extending in a radial direction of the crank axle, and
the coupling portion is at least partially provided in the coupling hole to couple the second body to the crank axle.

12. The bicycle crank assembly according to claim 9, wherein
the second member includes an extending portion extending from the second body along the rotational center axis of the crank axle, and
the extending portion is provided between the battery unit and an inner peripheral surface of the crank axle in a radial direction of the crank axle in a state where the first member and the second member hold the battery unit in the cavity.

13. The bicycle crank assembly according to claim 8, wherein the first electric contact is configured to be attached to the first member, and
the second electric contact is configured to be attached to the second member.

14. The bicycle crank assembly according to claim 13, further comprising:
a first connector configured to be electrically connected to the first electric contact; and
a second connector configured to be electrically connected to the second electric contact and configured to be detachably attached to the first connector to electrically connect the first electric contact to the second electric contact.

15. The bicycle crank assembly according to claim 14, wherein
the first connector is attached to the first member, and
the second connector is attached to the second member.

16. The bicycle crank assembly according to claim 15, wherein
at least one of the first connector and the second connector is provided between the battery unit and an inner peripheral surface of the crank axle in a radial direction of the crank axle in the state where the first member and the second member hold the battery unit in the cavity.

17. The bicycle crank assembly according to claim 8, wherein
the second member includes a resin material.

18. The bicycle crank assembly according to claim 1, wherein
the battery holding structure includes a seal member configured to be provided between the first member and an inner peripheral surface of the crank axle.

19. The bicycle crank assembly according to claim 1, wherein
the battery unit has a center axis defined along the rotational center axis in a state where the battery holding structure holds the battery unit in the cavity, and
the battery holding structure is configured to hold the battery unit in the cavity so that the center axis of the battery unit is offset from the rotational center axis.

20. The bicycle crank assembly according to claim 1, further comprising:
a chain wheel rotatable integrally with the crank axle and configured to engage with a bicycle chain, wherein
the crank axle includes a second end portion opposite to the first end portion, and
the chain wheel is closer to the second end portion than the first end portion.

21. The bicycle crank assembly according to claim 1, wherein
the first electric contact and the second electric contact are offset from the rotational center axis.

22. The bicycle crank assembly according to claim 1, wherein
the first electric contact faces the second electric contact along the rotational center axis across the space.

23. The bicycle crank assembly according to claim 1, wherein
a distance defined between the first electric contact and the second electric contact is longer than a distance between the first electric contact and the first end portion of the crank axle in a state where the first member is attached to the first end portion of the crank axle.

24. The bicycle crank assembly according to claim 1, wherein the crank axle includes a second end portion opposite to the first end portion, and a distance defined between the first electric contact and the second electric contact is longer than a distance between the second electric contact and the second end portion of the crank axle in a state where the first member is attached to the first end portion of the crank axle.

25. A bicycle crank assembly comprising:

a crank axle rotatable about a rotational center axis, the crank axle comprising:
  a cavity in which a battery unit is to be provided; and
  a first end portion having a first end opening which is in communication with the cavity, the first end opening facing in an axial direction parallel to the rotational center axis;
a first crank arm configured to be mounted on the first end portion, the first crank arm comprising:
  an inner peripheral surface defining an arm opening in which the first end portion is provided;
  a first arm cavity; and
  a through-hole connecting the first arm cavity with the arm opening;
a first electrical cable extending from the first arm cavity to the cavity via the through-hole and the first end opening;
a first connector electrically connected to the first electrical cable; and
a second connector configured to be detachably connected to the first connector, the first connector and the second connector being provided in the cavity in a state where the second connector is connected to the first connector;
wherein the first end portion includes an annular axial edge defining the first end opening, and
wherein the through-hole is at least partly disposed farther from the first connector and the second connector than the annular axial edge of the first end portion.

26. The bicycle crank assembly according to claim 25, further comprising:
  a cover element configured to cover the first end opening in a state where the first member is attached to the first end portion.

27. The bicycle crank assembly according to claim 25, further comprising:
  a first force sensing device mounted on the first crank arm to sense force applied to the first crank arm, wherein
  the first force sensing device includes a first strain sensor and is connected to the first electrical cable.

28. The bicycle crank assembly according to claim 25, wherein
  the first connector is provided between the first electrical cable and the second connector in the state where the second connector is connected to the first connector.

29. The bicycle crank assembly according to claim 25, wherein
  the annular axial edge defining the first end opening is disposed recessed from an outer surface of the first crank arm when the first crank arm is mounted on the first end portion of the crank axle.

\* \* \* \* \*